United States Patent
Engel

(10) Patent No.: US 7,961,958 B2
(45) Date of Patent: Jun. 14, 2011

(54) SYSTEM AND METHOD FOR RENDERING A BINARY VOLUME IN A GRAPHICS PROCESSING UNIT

(75) Inventor: Klaus D. Engel, West Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 945 days.

(21) Appl. No.: 11/235,407

(22) Filed: Sep. 26, 2005

(65) Prior Publication Data

US 2006/0159348 A1    Jul. 20, 2006

Related U.S. Application Data

(60) Provisional application No. 60/645,085, filed on Jan. 19, 2005.

(51) Int. Cl.
*G06K 9/36* (2006.01)
*G06K 9/46* (2006.01)

(52) U.S. Cl. .................. 382/232; 382/237; 345/501

(58) Field of Classification Search .............. 382/232, 382/237
See application file for complete search history.

(56) References Cited

U.S. PATENT DOCUMENTS

| 5,166,876 | A * | 11/1992 | Cline et al. ................ 345/424 |
| 5,793,375 | A * | 8/1998 | Tanaka ...................... 345/426 |
| 6,556,199 | B1 * | 4/2003 | Fang et al. ................. 345/424 |
| 7,133,041 | B2 * | 11/2006 | Kaufman et al. ........... 345/419 |
| 2004/0008882 | A1 * | 1/2004 | Hornegger et al. ......... 382/154 |
| 2004/0087850 | A1 * | 5/2004 | Okerlund et al. .......... 600/407 |

* cited by examiner

*Primary Examiner* — Xiao M Wu
*Assistant Examiner* — Edward Martello
(74) *Attorney, Agent, or Firm* — Donald B. Paschburg; F. Chau & Associates, LLC

(57) ABSTRACT

A system and method for rendering a binary volume in a GPU are provided. The method for rendering a binary volume comprises: storing eight bits of the binary volume along an x-axis in a byte of memory to form a compact representation of the binary volume; generating a two-dimensional decoding table of the compact representation of the binary volume; extracting a byte including a bit of interest from the compact representation of the binary volume; determining a bit coordinate for the bit of interest and extracting a decoded value of the bit of interest from the two-dimensional decoding table; obtaining a gray value of the decoded value of the bit of interest and classifying the gray value; and multiplying the decoded value of the bit of interest by the gray value to form a resultant value.

13 Claims, 3 Drawing Sheets

| 0 | 0 | 0 | 0 | 0 | 0 | 0 | 0 |
|---|---|---|---|---|---|---|---|
| 0 | 0 | 0 | 0 | 0 | 0 | 0 | 255 |
| 0 | 0 | 0 | 0 | 0 | 0 | 255 | 255 |
| 0 | 0 | 0 | 0 | 0 | 255 | 0 | 0 |
| 0 | 0 | 0 | 0 | 0 | 255 | 0 | 255 |
| 0 | 0 | 0 | 0 | 0 | 255 | 255 | 0 |
| 0 | 0 | 0 | 0 | 0 | 255 | 255 | 255 |
| 0 | 0 | 0 | 0 | 255 | 0 | 0 | 0 |
| 0 | 0 | 0 | 0 | 255 | 0 | 0 | 255 |
| 0 | 0 | 0 | 0 | 255 | 0 | 255 | 0 |
| ... | ... | ... | ... | ... | ... | ... | ... |
| 255 | 255 | 255 | 255 | 255 | 255 | 0 | 255 |
| 255 | 255 | 255 | 255 | 255 | 255 | 255 | 0 |
| 255 | 255 | 255 | 255 | 255 | 255 | 255 | 255 |

FIG. 3

SYSTEM AND METHOD FOR RENDERING A BINARY VOLUME IN A GRAPHICS PROCESSING UNIT

CROSS-REFERENCE TO RELATED APPLICATION

This application claims the benefit of U.S. Provisional Application No. 60/645,085, filed Jan. 19, 2005, the disclosure of which is herein incorporated by reference.

BACKGROUND OF THE INVENTION

1. Technical Field

The present invention relates to image processing, and more particularly, to a system and method for rendering a binary volume in a graphics processing unit.

2. Discussion of the Related Art

A graphics processing unit (GPU) is typically identified as the microprocessor of a graphics card for a personal computer or game console. Modern GPUs are very efficient at manipulating and displaying computer graphics and their highly-parallel structure makes them more effective than central processing units (CPUs) for a range of complex algorithms. For example, modern GPUs have all but taken over operations once performed by CPUs such as texture mapping and rendering of polygons and geometric calculations such as the mapping of vertexes into different coordinate systems.

As computer workstations with GPUs supporting the interactive rendering of complex three-dimensional (3D) polygon scenes consisting of directly lit and shaded triangles became widely available, techniques for texture-based rendering of grayscale volumetric datasets were developed. Building upon these techniques, volume rendering methods using binary masks began to appear. These methods, however, encountered difficulties in attempting to distinguish between different types of material based solely on grayscale values that were measured during the acquisition of volumetric data. To remedy this, binary segmentation masks were employed to mark wanted and unwanted parts of the volumetric data.

When a binary volume is in its native form as a binary segmentation mask, flags for eight neighboring voxels along an x-axis are stored in a single byte. Such binary volumes cannot be easily stored and rendered using GPUs. This occurs since neither boolean operations for fragment processing nor texture formats for binary data are utilzed by modern GPUs. Because of this, binary volumes are often expanded by assigning a byte value to each bit of the original volume. The volumes are then stored in GPU memory. This, however, results in increasing the storage requirements of a GPU memory by a factor of, for example, 8, 16 or 32, which is neither desirable nor practical especially when dealing with large volumes.

One technique for reducing the memory requirements of a GPU involves "burning" a binary segmentation mask into a gray volume by setting data corresponding to the binary segmentation mask to a specified value. This technique, however, leads to a loss of information in the gray volume since burned-in data values are not distinguishable from original data values of the gray volume. In addition, this technique can lead to undesirable artifacts in rendered images when using, for example, post-interpolative transfer functions. As such, there is a need for a technique of reducing the amount of memory used by a GPU when rendering a binary volume.

SUMMARY OF THE INVENTION

The present invention overcomes the foregoing and other problems encountered in the known teachings by providing a system and method for rendering a binary volume in a GPU.

In one embodiment of the present invention, a method for rendering a binary volume comprises: storing eight bits of the binary volume along an x-axis in a byte of memory to form a compact representation of the binary volume; generating a two-dimensional decoding table of the compact representation of the binary volume; extracting a byte including a bit of interest from the compact representation of the binary volume; determining a bit coordinate for the bit of interest and extracting a decoded value of the bit of interest from the two-dimensional decoding table; obtaining a gray value of the decoded value of the bit of interest and classifying the gray value; and multiplying the decoded value of the bit of interest by the gray value to form a resultant value.

The method further comprises: receiving gray volume data; and deriving the binary volume from the gray volume data. The gray volume data is acquired by using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, x-ray imaging or digital scanning technique.

The method further comprises masking voxels of the gray volume data using the resultant value. Generating a two-dimensional decoding table of the compact representation of the binary volume comprises: generating a table having 8 j-column X 256 i-row entries; setting values inside the table to 255 if a j-th bit in an i-byte is 1 and to 0 otherwise; and storing the table in a two-dimensional texture in the memory.

Determining a bit coordinate for the bit of interest comprises multiplying a texture coordinate of a voxel of gray volume data associated with the bit of interest by a number of voxels along the x-axis of the byte divided by eight, wherein a fractional part of the multiplication result is the bit coordinate. The decoded value of the bit of interest from the two-dimensional decoding table is extracted by using the bit coordinate and a byte corresponding to the bit coordinate as lookup values in the two-dimensional decoding table. The method further comprises blending the resultant value into a frame buffer. Classifying the gray value comprises looking up a red, green, blue, alpha (RGBA) value in a one-dimensional lookup table for assigning color and opacity values to the gray value.

In another embodiment of the present invention, a system for rendering a binary volume comprises: a memory device for storing a program; a processor in communication with the memory device, the processor operative with the program to: store eight bits of the binary volume along an x-axis in a byte of a graphics processing unit (GPU) memory to form a compact representation of the binary volume; generate a two-dimensional decoding table of the compact representation of the binary volume; extract a byte including a bit of interest from the compact representation of the binary volume; determine a bit coordinate for the bit of interest and extract a decoded value of the bit of interest from the two-dimensional decoding table; obtain a gray value of the decoded value of the bit of interest and classify the gray value; and multiply the decoded value of the bit of interest by the gray value to form a resultant value.

The processor is further operative with the program code to: receive gray volume data; and derive the binary volume from the gray volume data. The gray volume data is acquired using one of an MR, CT, PET, a 2D or 3D fluoroscopic, a 2D, 3D, or 4D ultrasound, x-ray imaging or digital scanning device. The processor is further operative with the program code to: mask voxels of the gray volume data using the resultant value.

When generating a two-dimensional decoding table of the compact representation of the binary volume the processor is further operative with the program code to: generate a table having 8 j-column X 256 i-row entries; set values inside the table to 255 if a j-th bit in an i-byte is 1 and to 0 otherwise; and store the table in a two-dimensional texture in the memory.

When determining a bit coordinate for the bit of interest the processor is further operative with the program code to: multiply a texture coordinate of a voxel of gray volume data associated with the bit of interest by a number of voxels along the x-axis of the byte divided by eight, wherein a fractional part of the multiplication result is the bit coordinate. The processor is further operative with the program code to: blend the resultant value into a GPU frame buffer.

In yet another embodiment of the present invention, a method for rendering a binary volume in a GPU, comprises: preprocessing the binary volume by storing eight bits of the binary volume along an x-axis in a byte of memory of the GPU to form a compact representation of the binary volume and generating a decoding table of the compact representation of the binary volume; and rendering the binary volume by extracting a byte including a bit of interest from the compact representation of the binary volume, determining a bit coordinate for the bit of interest and using the bit coordinate and byte as lookup values in the decoding table to mask out voxels from the binary volume.

The pre-processing technique is one of a volume segmentation or volume editing. The rendering is one of a direct volume rendering, a maximum intensity projection (MIP), minimum intensity projection (MinIP), multi-planar reformatting (MPR) or digitally reconstructed radiograph (DRR). A binary segmentation mask is applied during rendering to mask out voxels from a gray volume used to derive the binary volume.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 3 is a two-dimensional decoding table according to an exemplary embodiment of the present invention.

DETAILED DESCRIPTION OF EXEMPLARY EMBODIMENTS

Figure 1:
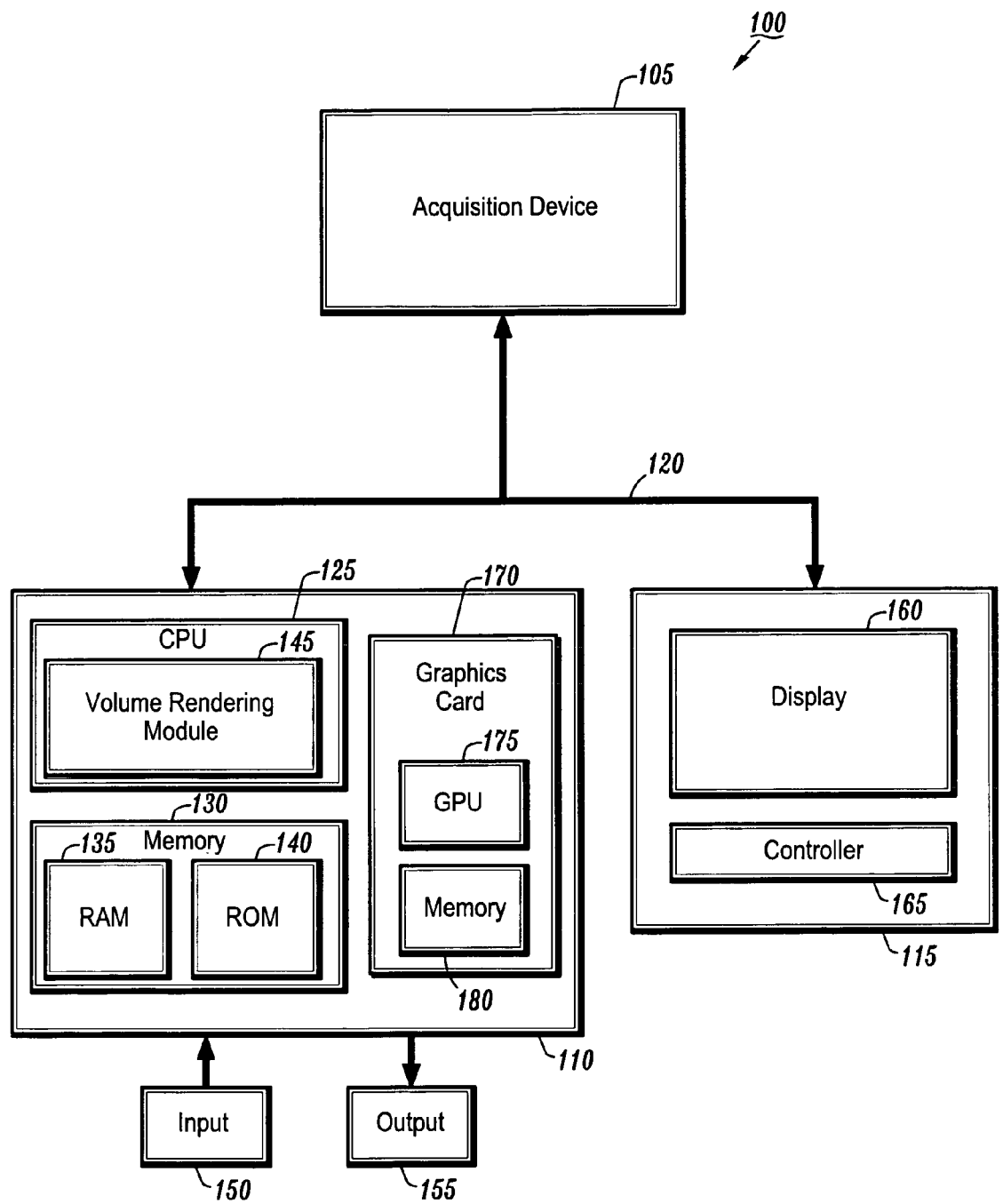
FIG. 1 is a block diagram of a system for rendering a binary volume in a GPU according to an exemplary embodiment of the present invention.

FIG. 1 is a block diagram of a system 100 for rendering a binary volume in a GPU according to an exemplary embodiment of the present invention.

As shown in FIG. 1, the system 100 includes, inter alia, an acquisition device 105, a personal computer (PC) 110 and an operator's console 115 connected over, for example, an Ethernet network 120. The acquisition device 105 may be a magnetic resonance imaging (MRI) device, a computed tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, or an x-ray device.

The acquisition device 105 may also be a hybrid-imaging device capable of CT, MR, PET or other imaging techniques. The acquisition device 105 may further be a flatbed scanner that takes in an optical image and digitizes it into an electronic image represented as binary data to create a computerized version of a photo or illustration.

The PC 110, which may be a portable or laptop computer or a personal digital assistant (PDA), includes a CPU 125, a memory 130 and a graphics card 170, which are connected to an input device 150 and an output device 155. The CPU 125 includes a volume rendering module 145 that includes one or more methods for rendering a binary volume in a GPU. It is to be understood, however, that the volume rendering module 145 could be included in the graphics card 170.

The memory 130 includes a random access memory (RAM) 135 and a read only memory (ROM) 140. The memory 130 can also include a database, disk drive, tape drive or a combination thereof. The RAM 135 functions as a data memory that stores data used during execution of a program in the CPU 125 and is used as a work area. The ROM 140 functions as a program memory for storing a program executed in the CPU 125. The input device 150 is constituted by a keyboard or mouse and the output device 155 is constituted by a liquid crystal display (LCD), cathode ray tube (CRT) display or printer.

The graphics card 170, which is used to take binary data from the CPU 125 and turn it into an image, includes, inter alia, a GPU 175 and a memory 180. The GPU 175 determines what to do with each pixel to be displayed on, for example, the output device 155 or a display 160 of the operator's console 115. In operation, the GPU 175 makes a 3D image by first creating a wire frame out of straight lines, rasterizing the image and adding lighting, texture and color to the 3D image. The memory 180, which may be a RAM, holds information regarding each pixel and temporarily stores completed images. Although not shown, the graphics card 170 also includes a connection to a motherboard, which also holds the CPU 125, for receiving data and power and a connection to the output device 155 for outputting the picture.

It is to be understood that the memory 180 could be included in the GPU 175 or that the GPU 175 could include its own memory for performing certain storage tasks according to an exemplary embodiment of the present invention.

The operation of the system 100 is typically controlled from the operator's console 115, which includes a controller 165 such as a keyboard, and the display 160 such as a CRT display. The operator's console 115 communicates with the PC 110 and the acquisition device 105 so that 2D image data collected by the acquisition device 105 can be rendered into 3D data by the PC 110 and viewed on the display 160. It is to be understood that the PC 110 can operate and display information provided by the acquisition device 105 absent the operator's console 115, using, for example, the input device 150 and output device 155 to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D renderings and visualizations of medical image data, and which executes on a general purpose or specific computer workstation. More-over, the image rendering system may enable a user to navigate through a 3D image or a plurality of 2D image slices. The PC 110 may also include an image rendering system/tool/application for processing digital image data of an acquired image dataset to generate and display 2D and/or 3D images.

The volume rendering module 145 may also be used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2:
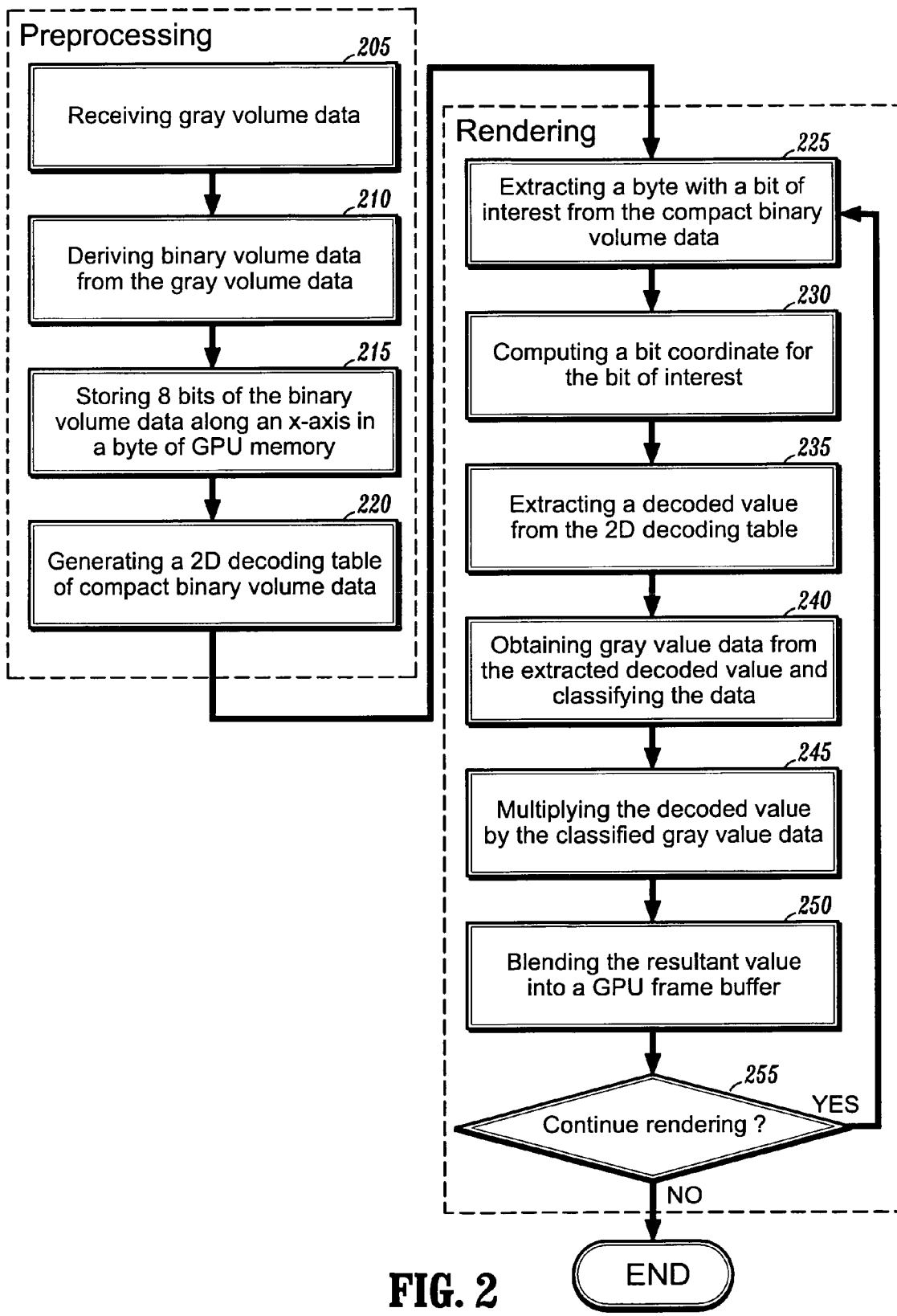
FIG. 2 is a flowchart of a method for rendering a binary volume in a GPU according to an exemplary embodiment of the present invention.

FIG. 2 illustrates a flowchart of a method for rendering a binary volume in a GPU according to an exemplary embodiment of the present invention.

As shown in FIG. 2, gray volume data is received by the CPU 125 during a preprocessing stage (205). This is accomplished by acquiring image data of, for example, a pulmonary vessel tree. The image data may be acquired by using the acquisition device 105, in this example a CT scanner, which is operated at the operator's console 115, to scan a patient's chest or lungs thereby generating a series of 2D image slices associated with the lungs. The 2D image slices of the lungs are then combined and the gray volume data of the pulmonary vessel tree is stored in the RAM 135 of the CPU 125.

It is to be understood that the image data can be from any body organ of interest such as the heart or colon and can be acquired using a variety of medical imaging modalities such as those employed by the acquisition device 105 discussed above. It should also be understood that the image data could be non-medical image data such as a vehicle or a tree and can be acquired, for example, by taking a digital or conventional photograph and then using a digital scanner to create a digital representation thereof.

Once the gray volume data has been received by the CPU 125, binary volume data is derived therefrom using, for example, a volume editing or segmentation algorithm (210). The derived binary volume data is then sent to the graphics card 170. At this point, the binary volume data is stored in the memory 180 of the graphics card 170 for access by the GPU 175 (215). This is accomplished by storing every eight bits of the binary volume data along an x-axis in a separate byte of the memory 180 to form a compact representation of the binary volume data. If, for example, only four bits of the binary volume data remain to be stored when all the other bits of the binary volume data have been stored, the four bits are stored along the x-axis of another byte and the other four bits of the byte are padded with a 0 or 1.

After the binary volume data has been stored, a 2D decoding table of the compact binary volume data is generated (220). This is done by first generating a table having 256 entries in one dimension (one for each possible combination of bits in a byte) and eight entries in another dimension (one entry for each bit position in the byte). Values are set inside the table to 255 for entries that have a value of 1 in a byte associated with a bit address and values are set inside the table to 0 for entries that have a value of 0 in a byte associated with the bit address. In other words, assuming the table has eight j-columns and 256 i-rows, values are set to 255 if aj-th bit in a byte i is 1; otherwise the values are set to 0. After the table has been generated, it is stored in the memory 180 as a 2D texture.

The following pseudo code shows how the 2D decoding table can be set up:

```
VOID CREATEDECODINGTABLE( )
{
    // ALLOCATE TABLE
    UINT8 DATA[8*256];
    UINT32 POS = 0;
    // FILL TABLE
    FOR Y=0 TO 255
        FOR X=0 TO 7
            IF (Y & (0X1 << 7-X)))
                DATA[POS++] = MAX;
            ELSE
                DATA[POS++] = 0;
    // GENERATE TEXTURE
    GENTEXTURES(1, &MIRREGVOILUT);
    // BIND TEXTURE
    BINDTEXTURE(TEXTURE_2D, MIRREGVOILUT);
    // UPLOAD TEXTURE TO GPU
    TEXIMAGE2D(
        TEXTURE_2D,      // TARGET
        0,               // LEVEL
        LUMINANCE8,      // INTERNAL
        8,               // WIDTH
        256,             // HEIGHT
        0,               // BORDER
        LUMINANCE,       // FORMAT
        UNSIGNED_BYTE,   // TYPE
        DATA);
    // SET NEAREST NEIGHBOR INTERPOLATION
    TEXPARAMETERI(TEXTURE_2D,
            TEXTURE_MAG_FILTER,
            NEAREST);
    TEXPARAMETERI(TEXTURE_2D,
            TEXTURE_MIN_FILTER,
            NEAREST);
    // REPEAT TEXTURE ALONG S, CLAMP ALONG T
    TEXPARAMETERI(TEXTURE_2D,
            TEXTURE_WRAP_S,
            REPEAT);
    TEXPARAMETERI(TEXTURE_2D,
            TEXTURE_WRAP_T,
            CLAMP_TO_EDGE);
}
```

As illustrated by the pseudo code, a 2D decoding table shown, for example, in FIG. 3, is generated by first allocating a byte array, looping through all fields of the array and setting the bytes therein to 255 if a set bit in a corresponding byte indicates that a value of 1 should be entered. If the set bit indicates that a value of 0 should be entered, the bytes corresponding thereto are set to 0. After this is completed, a texture reflecting input binary volume data is generated, the table is uploaded to the GPU 175 and texture parameters are set.

Now that the table has been generated, a volume rendering may take place. It is to be understood that the rendering can be any one of a direct volume rendering, a maximum intensity projection (MIP), minimum intensity projection (MinIP), multi-planar reformatting (MPR) or digitally reconstructed radiograph (DRR). To perform the volume rendering, a byte including a bit of interest is first extracted from the compact binary volume data (225). This is done by fetching the byte from the memory 180 while executing, for example, a fragment program.

Once the byte including the bit of interest is extracted, a bit coordinate indicating the location of the bit of interest is computed (e.g., bitCoord) (230). This is done by multiplying the original texture coordinate associated with a voxel of the gray volume data (e.g., texCoord) on the x-axis by a factor that is computed by taking the fractional part of the number of voxels along the x-axis from where the bit of interest was extracted and dividing it by eight. Thus, a bit coordinate is derived by scaling the texture coordinate for the x-axis by a constant factor (e.g., numVoxelsX/8).

It is to be understood that the above described computation can be represented mathematically by, bitCoord=frac (texCoord*numVoxels/8). In addition, the REPEAT parameter from the above pseudo code is used to make sure that only the fractional part of the texture coordinate is taken into account during step 230.

Referring still to step 230, since texture space coordinates are usually in a range from 0 to 1, scaled texture coordinates may be used to identify the direction in which bits are packed into bytes. Thus, as a texture coordinate is given in the range from 0 to Size/8 where Size refers to the number of voxels that the volumetric data set consists of in that direction, the fractional part of the scaled texture coordinate is what is used as a lookup value in the decoding table in the bit direction. In other words, by scaling original texture coordinates in the direction in which the bits are packed into bytes, a bit coordinate may be derived as discussed above.

After computing the bit coordinate for the bit of interest, a decoded value of the bit of interest is extracted from the decoding table (235). This is accomplished by using the bit coordinate and its corresponding byte as lookup values in the decoding table. Then, a sample of the gray volume data is obtained and classified (240). The sample is obtained by fetching an interpolated data value from the gray volume data using the original (e.g., unscaled) texture coordinates. The classification is achieved, for example, by looking up a red, green, blue, alpha (RGBA) value using the sample from a one-dimensional (1D) lookup table containing a transfer function that may be user specified. The transfer function is used to assign color (e.g., RGB) and opacity (e.g., A) values to the sample.

It is to be understood that the sample is a data value associated with the current position in the volume being rendered. In other words, the sample is an interpolated data value taken from the gray volume during rendering. After the sample of the gray volume data has been obtained and classified, it is multiplied by the decoded value of the bit of interest to form a resultant value (245).

At this point, the resultant value may be blended into a frame buffer of the GPU 175 (250). For example, if the decoded value of the bit of interest is 1, the resultant value would indicate that the classification result is to be maintained and thus the decoded value is to be blended into the frame buffer. If, however, the decoded value were 0, the decoded value would not be blended into the frame buffer. In other words, when the decoded value is 0 the masked voxel associated therewith does not contribute to the final image. Further, if the resultant value is an RGBA value of, for example, 0000, nothing is blended into the frame buffer. Using this approach, parts of the original gray volume data that refer to 0 entries of the binary volume data are masked. In the alternative, the decoded value can be used with another rendering approach or classification such as an if-then-else branch in a fragment program.

After the resultant value has been blended (or not by using a kill fragment command or an alpha-test) into the frame buffer, it is determined if the rendering is to continue (255). If the rendering is to continue, the process returns to step 225 and repeats. If, however it has been determined that the rendering is to stop, when for example all samples from the original gray volume data have been processed and an image is generated, the process ends. It is to be understood that the binary volume could be rendered directly or combined with a gray volume so that voxels can be masked out or assigned different color and opacity values. Further, the rendering can be any conventional rendering method used for rendering gray volume data.

The following example of pseudo code demonstrates a rendering of a binary volume with bits along an x-axis packed into bytes:

```
STRUCT V2F {
    FLOAT3 TEXCOORD0 : TEXCOORD0;
    FLOAT3 TEXCOORD1 : TEXCOORD1;
};
FLOAT4 MAIN(V2F IN,
        UNIFORM SAMPLER3D BINARYVOLUME,
        UNIFORM SAMPLER2D DECODINGTABLE) : COLOR
{
    FLOAT SAMPLE = TEX3D(BINARYVOLUME,
    IN.TEXCOORD0).X;
RETURN TEX2D(DECODINGTABLE, FLOAT2(IN.TEXCOORD1.X,
SAMPLE)).XXXX;
}
```

In the above pseudo code it is to be understood that a bit coordinate derived from a scaled texture coordinate is passed in as IN.TexCoord1.x, while standard texture coordinates in the range from 0 to 1 are passed in as IN.TexCoord0. As shown, a sample from the binary volume is taken. Then by using the binary volume sample (as a y-coordinate) and the bit coordinate (as an x-coordinate) as lookup values in the decoding table, the correct bit from the given byte is decoded. By repeating the decoding table in the bit direction (initiated by the above mentioned REPEAT parameter), the scaled texture coordinate accesses the correct position in the decoding table for coordinates outside the range from 0 to 1, thus only the fractional portion is taken into account.

The following pseudo code demonstrates how to render a volumetric dataset with a classification by applying a binary segmentation mask to remove parts of the volume where bits in the segmentation mask are not set:

```
STRUCT V2F_SIMPLE {
    FLOAT3 TEXCOORD0 : TEXCOORD0;
    FLOAT3 TEXCOORD1 : TEXCOORD1;
};
FLOAT4 MAIN(V2F_SIMPLE IN,
        UNIFORM SAMPLER3D VOLUME,
        UNIFORM SAMPLER1D TRANSFERFUNCTION,
        UNIFORM SAMPLER3D SEGMENTATIONMASK,
        UNIFORM SAMPLER2D DECODINGTABLE) : COLOR
{
    FLOAT SAMPLE = TEX3D(VOLUME, IN.TEXCOORD0).X;
    FLOAT SEGM = TEX3D(SEGMENTATIONMASK,
    IN.TEXCOORD0).X;
    RETURN TEX1D(TRANSFERFUNCTION, SAMPLE)
        * TEX2D(DECODINGTABLE, FLOAT2(IN.TEXCOORD1.X,
        SEGM)).X;
}
```

In the above pseudo code, a bit coordinate derived from a scaled texture coordinate is passed in as IN.TexCoord1.x, while standard texture coordinates in the range from 0 to 1 are passed in as IN.TexCoord0. As shown, a sample from the volume is fetched and a sample from a segmentation mask is then acquired. By returning an RGBA color from a classification that has been multiplied with the result from the decoding table, parts of the volume where the segmentation mask contains 0-bits are masked out. In other words, the colors and alpha values are set to 0.

In accordance with an exemplary embodiment of the present invention, a compact representation of a binary volume is rendered. This enables binary volumes to be rendered directly from their native representation, thereby reducing the amount of GPU memory needed for rendering large volume datasets. In addition, a binary segmentation mask can be applied to original volume data during rendering of a compact representation of the mask. Thus, the binary segmentation mask can be separated from the original volume data. Accordingly, artifacts that result from burning the segmentation mask into the original volume data can be prevented.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention. For example, although steps 225-240 have been shown in sequence, step 240 could take place before steps 225-235 or it could take place after step 225 or 230.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention.

It is therefore intended that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for rendering a binary volume in a graphics processing unit (GPU), comprising:
   receiving gray volume data;
   deriving a binary volume from the gray volume data;
   storing every eight adjacent bits of the binary volume along an x-axis in a separate byte of a GPU's memory to form a compact representation of the binary volume;
   generating a two-dimensional decoding table of the compact representation of the binary volume; and
   rendering the compact representation of the binary volume, wherein the rendering comprises: extracting a byte including a bit of interest from the compact representation of the binary volume; computing a bit coordinate indicating a location of the bit of interest; using the bit coordinate and its corresponding byte as lookup values in the decoding table to extract a decoded value of the bit of interest; fetching an interpolated data value of the bit of interest from the gray volume data by using original texture coordinates of the bit of interest and assigning color and opacity values to the interpolated data value; multiplying the decoded value of the bit of interest by the interpolated data value to form a resultant value; and blending the resultant value into the GPU's frame buffer, and
   wherein computing a bit coordinate indicating a location of the bit of interest comprises:
   multiplying original texture coordinates of a voxel of the gray volume data associated with the bit of interest on the x-axis by a factor that is computed by taking a fractional part of a number of voxels along the x-axis from where the bit of interest was extracted and dividing it by eight.

2. The method of claim 1, wherein the gray volume data is acquired by using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, x-ray imaging or digital scanning technique.

3. The method of claim 1, further comprising:
   masking voxels of the gray volume data using the resultant value.

4. The method of claim 1, wherein generating a two-dimensional decoding table of the compact representation of the binary volume comprises:
   generating a table having 8 j-column X 256 i-row entries;
   setting values inside the table to 255 if aj-th bit in an i-byte is 1 and to 0 otherwise; and
   storing the table in a two-dimensional texture in the memory.

5. The method of claim 1, wherein assigning color and opacity values to the interpolated data value comprises:
   looking up a red, green, blue, alpha (RGBA) value in a one-dimensional lookup table containing a transfer function.

6. A graphics card for rendering a binary volume, comprising:
   a memory device for storing a program; and
   a processor in communication with the memory device, the processor operative with the program to:
   receive gray volume data;
   derive a binary volume from the gray volume data;
   cause every eight adjacent bits of the binary volume along an x-axis to be stored in a separate byte of the memory to form a compact representation of the binary volume;
   generate a two-dimensional decoding table of the compact representation of the binary volume; and
   render the compact representation of the binary volume, wherein the processor is operative with the program during the rendering to: extract a byte including a bit of interest from the compact representation of the binary volume; compute a bit coordinate indicating a location of the bit of interest; use the bit coordinate and its corresponding byte as lookup values in the decoding table to extract a decoded value of the bit of interest; fetch an interpolated data value of the bit of interest from the gray volume data by using original texture coordinates of the bit of interest and assign color and opacity values to the interpolated data value; multiply the decoded value of the bit of interest by the interpolated data value to form a resultant value; and blend the resultant value into the processor's frame buffer, and wherein when computing a bit coordinate indicating a location of the bit of interest the processor is further operative with the program to:

multiply original texture coordinates of a voxel of the gray volume data associated with the bit of interest on the x-axis by a factor that is computed by taking a fractional part of a number of voxels along the x-axis from where the bit of interest was extracted and dividing it by eight.

7. The system of claim 6, wherein the gray volume data is acquired using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, x-ray imaging or digital scanning device.

8. The system of claim 6, wherein the processor is further operative with the program to:

mask voxels of the gray volume data using the resultant value.

9. The system of claim 6, wherein when generating a two-dimensional decoding table of the compact representation of the binary volume the processor is further operative with the program to:

generate a table having 8 j-column X 256 i-row entries;
set values inside the table to 255 if a j-th bit in an i-byte is 1 and to 0 otherwise; and
store the table in a two-dimensional texture in the memory.

10. A method for rendering a binary volume in a graphics processing unit (GPU), comprising:

receiving gray volume data;
deriving a binary volume from the gray volume data;
preprocessing the binary volume by storing every eight adjacent bits of the binary volume along an x-axis in a separate byte of memory of a GPU to form a compact representation of the binary volume, and generating a decoding table of the compact representation of the binary volume; and rendering the compact representation of the binary volume by extracting a byte including a bit of interest from the compact representation of the binary volume, computing a bit coordinate indicating a location of the bit of interest; using the bit coordinate and its corresponding byte as lookup values in the decoding table to extract a decoded value of the bit of interest; fetching an interpolated data value of the bit of interest from the gray volume data by using original texture coordinates of the bit of interest and assigning color and opacity values to the interpolated data value; multiplying the decoded value of the bit of interest by the interpolated data value to form a resultant value; and blending the resultant value into the GPU's frame buffer to mask out voxels from the binary volume, wherein computing a bit coordinate indicating a location of the bit of interest comprises:

multiplying original texture coordinates of a voxel of the gray volume data associated with the bit of interest on the x-axis by a factor that is computed by taking a fractional part of a number of voxels along the x-axis from where the bit of interest was extracted and dividing it by eight.

11. The method of claim 10, wherein the pre-processing technique is one of a volume segmentation or volume editing.

12. The method of claim 10, wherein the rendering is one of a direct volume rendering, a maximum intensity projection (MIP), minimum intensity projection (MinIP), multi-planar reformatting (MPR) or digitally reconstructed radiograph (DRR).

13. The method of claim 10, wherein a binary segmentation mask is applied during rendering to mask out voxels from the gray volume data used to derive the binary volume.

* * * * *